E. N. KRAEMER.
COMPASS.
APPLICATION FILED JAN. 7, 1909.
1,035,973.
Patented Aug. 20, 1912.
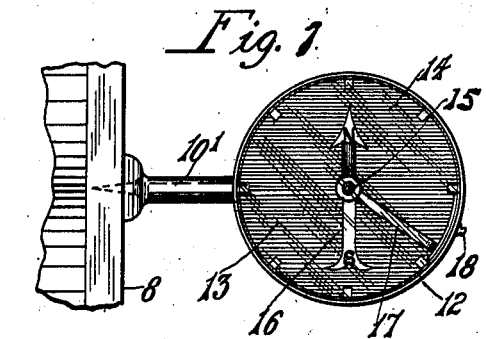
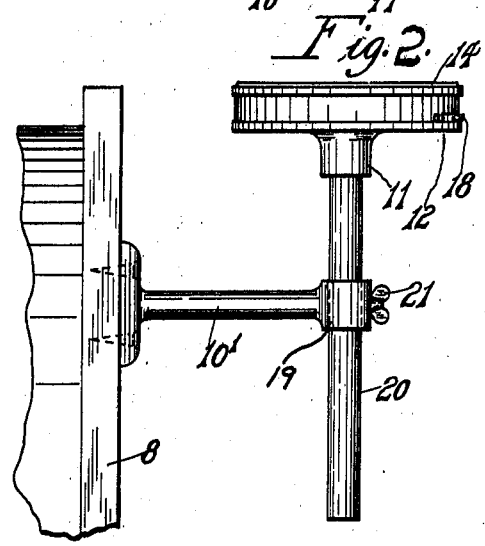
Witnesses.
A. Y. Andrews.
Anna F. Schmittbauer
Inventor.
Edwin N. Kraemer.
By Benedict, Morsell & Caldwell.
Attorneys.

UNITED STATES PATENT OFFICE.

EDWIN N. KRAEMER, OF MILWAUKEE, WISCONSIN.

COMPASS.

1,035,973.　　　　Specification of Letters Patent.　　Patented Aug. 20, 1912.

Application filed January 7, 1909. Serial No. 471,082.

*To all whom it may concern:*

Be it known that I, EDWIN N. KRAEMER, residing in Milwaukee, in the county of Milwaukee and State of Wisconsin, have invented new and useful Improvements in Compasses, of which the following is a description, reference being had to the accompanying drawings, which are a part of this specification.

This invention relates to improvements in compasses particularly adapted for use in automobiles and other vehicles.

In attaching a compass to an automobile or other vehicle it has been found that persons who are not skilled in reading the compass are often confused in locating the points of the compass due to the fact that the face or dial of the compass is fixed with relation to the vehicle and as the characters designating the points of the compass are usually on the dial they turn with the vehicle and in different vehicles may be differently positioned. The needle or arrow of course always points to the magnetic north regardless of the direction in which the vehicle is traveling, and consequently the needle may point to any one of the characters on the dial and the occupants of the vehicle may possibly become confused thereby and think they are traveling in the direction indicated by the character to which the needle is pointing. By means of the improved compass hereinafter described these possibilities and difficulties are obviated and a compass is provided which may be read by persons unskilled in the science of traveling by compass in the ordinary way.

The principal object of this invention is to provide a compass which may be easily read by the occupants of the vehicle to which it is attached without liability of their becoming confused as to points of direction due to the rigid connection of the compass case to the vehicle.

A further object of this invention is to provide a compass in which the usual characters designating the points of the compass on the dial or face thereof are omitted and in lieu thereof characters are delineated directly on the magnetic needle or arrow of the compass.

A still further object of this invention is to provide a compass which may be easily attached to an automobile or other vehicle.

With the above, and other objects in view, the invention consists of the device and its parts and all equivalents thereof, as hereinafter set forth.

Referring to the accompanying drawing in which the same reference characters indicate the same parts in all of the views; Figure 1 is a plan view of the improved compass shown attached to a fragment of the dash board of an automobile; and Fig. 2 is a side view thereof.

In the drawing the numeral 8 indicates the dash board of an automobile and 9 the compass attached thereto by means of a right angled arm or bracket 10'. The upper end of the arm is securely fastened to a boss 11 depending from the bottom of the compass casing and the lower end is T-shaped and provided with screw openings to accommodate screws for attaching the compass to a vehicle. The casing 12 of the compass is of ordinary construction and is provided with a dial or face 13 dark in color and a glass cover 14 spaced therefrom. A pivot pin 15 extends upwardly from the center of the dial and the magnetic needle or pointer 16 is pivotally mounted thereon. This needle is in the shape of an arrow and has delineated thereon the characters N and S to designate the north and south poles of said needle. The north pole of the magnet is dark in color with the exception of the arrow head which is light and the south pole or tail of the arrow is light and as the dial is dark in color the needle is sufficiently distinguished therefrom to be visible in the dark. The usual characters designating the points of the compass are omitted from the dial and in lieu thereof are marks in the form of dots or dashes light in color. The compass is provided with the usual lever 17 and operating knob 18 to lift the needle from its pivotal point and press it against the lower surface of the glass cover to bring the needle to a position of rest and also to prevent the rattling and wear of the parts. The arm or bracket 10' is in two parts and adjustable with relation to each other in order to raise or lower the compass. And the horizontal portion of the arm or bracket 10' is provided with an opening 19 through which is adapted to slide the vertical portion of the arm in the form of a rod 20 connected to the depending boss of the compass casing. A thumb bolt 21 threaded in the outer end of the arm 10' impinges against the rod 20 and holds it in adjusted position.

From the foregoing description it will be seen that a compass is provided which may be easily read by persons unskilled in this science as the characters on the needle itself clearly indicate the north and south points and it is only necessary for the person to know that from the arrow head a point one quarter way around to the right is the east and one quarter way around to the left is west, without taking into account the position of the dial, and the contrasting colors of the dial and needle provide for the needle being visible in the dark.

What I claim as my invention is:—

A compass, comprising a casing provided with a stationary dial and having a depending portion, a supporting arm, a rod connected to said depending portion and vertically adjustably connected to the supporting arm, and a magnetic needle or pointer pivotally mounted within the casing, the letters N and S being delineated only on the needle to indicate the magnetic poles of the compass, the needle and the dial being of contrasting colors.

In testimony whereof, I affix my signature, in presence of two witnesses.

EDWIN N. KRAEMER.

Witnesses:
C. H. KEENEY,
ALMA A. KLUG.